United States Patent
Fendt et al.

(10) Patent No.: US 6,477,457 B1
(45) Date of Patent: Nov. 5, 2002

(54) METHOD FOR TRANSMITTING POWER AND DATA IN A BUS SYSTEM PROVIDED FOR OCCUPANT PROTECTION DEVICES

(75) Inventors: Guenter Fendt, Schrobenhausen (DE); Norbert Mueller, Schrobenhausen (DE); Micheal Bischoff, Adelschlag (DE); Johannes Rinkens, Ingolstadt (DE); Stefan Schaeffer, Schrobenhausen (DE); Werner Nitschke, Ditzingen (DE); Otto Karl, Leonberg (DE); Joachim Bauer, Oberstenfeld (DE)

(73) Assignees: Temic Telefunken microelectronic GmbH, Heilbronn (DE); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,335
(22) PCT Filed: Mar. 9, 1999
(86) PCT No.: PCT/EP99/01503
§ 371 (c)(1), (2), (4) Date: Sep. 27, 2000
(87) PCT Pub. No.: WO99/50106
PCT Pub. Date: Oct. 7, 1999

(30) Foreign Application Priority Data

Mar. 28, 1998 (DE) .......................... 198 13 955

(51) Int. Cl.$^7$ ............................................. B60R 21/32
(52) U.S. Cl. ........................... 701/45; 280/735
(58) Field of Search ................. 701/45; 280/734, 280/735; 307/10.1

(56) References Cited

U.S. PATENT DOCUMENTS

| 4,222,030 A | | 9/1980 | Yasui et al. | |
|---|---|---|---|---|
| 4,736,367 A | | 4/1988 | Wroblewski et al. | |
| 5,058,920 A | * | 10/1991 | Burger et al. | 280/735 |
| 5,760,489 A | * | 6/1998 | Davis et al. | 307/10.1 |
| 6,188,314 B1 | * | 2/2001 | Wallace et al. | 340/438 |

FOREIGN PATENT DOCUMENTS

| DE | 3919376 | 12/1990 |
|---|---|---|
| DE | 4302032 | 8/1994 |
| DE | 4441184 | 6/1995 |
| DE | 19625401 | 9/1997 |
| DE | 19717155 | 10/1997 |
| DE | 19643013 | 2/1998 |
| DE | 19751910 | 3/1999 |
| EP | 0471871 | 2/1992 |

OTHER PUBLICATIONS

Motorola Semiconductor Application Note AN 475/D; Burri/Renard Single Wire MI Bus Controlling Stepper Motors, 1993.

* cited by examiner

Primary Examiner—Michael J. Zanelli
(74) Attorney, Agent, or Firm—W. F. Fasse; W. G. Fasse

(57) ABSTRACT

Information data and energy are transmitted from a central control to control modules through a bus system in an occupant protection system including occupant protection devices such as airbags. In order to avoid overloading the protection system due to an immediate recharging of an energy storage member after that member triggers an occupant protection device, such recharging is suppressed or interrupted, preferably until a reset command signal is received by the respective control module from the central control.

6 Claims, 1 Drawing Sheet

US 6,477,457 B1

METHOD FOR TRANSMITTING POWER AND DATA IN A BUS SYSTEM PROVIDED FOR OCCUPANT PROTECTION DEVICES

FIELD OF THE INVENTION

The invention relates to a method for transmitting power and data in a bus system for occupant protection devices in vehicles. The invention also relates to a control module for performing the method.

BACKGROUND INFORMATION

Methods and devices for performing such methods are known from German Patent Publications DE 44 41 184, DE 196 43 013, and DE 197 51 910. The respective goal is to safeguard the safety relevant peripheral control modules against short duration disturbances, for example interruptions or overloads of the d.c. voltage from a bus system required for the power supply. Furthermore, in the conventional methods, digital data are transmitted over the same conductor section, with the power supply, by voltage modulation of the d.c. voltage. U.S. Pat. No. 4,736,367 and a Motorola Semiconductor Application Note AN475/D by Burri/Renard: "Single Wire MI Bus controlling stepper motors", 1993, also disclose d.c. voltage modulated data transmission.

The special problem of current loading of the bus system during simultaneous transmission of power and data has been described particularly in German Patent Publications DE 196 43 013 and DE 197 51 910. Thus, there is the risk that it will be impossible to process the data.

For example, in bus systems in motor vehicles, direct current or d.c. voltage is usually used for the power supply, onto which the data can be modulated. Due to an excessively high current consumption or other factors that act upon the d.c. voltage, the data modulated onto the d.c. voltage can become unrecognizable.

The data transmission, particularly for safety relevant bus systems for power and data transmission with several control modules arranged within the bus system, which modules are also to be triggered sequentially, must not be jeopardized, for example, by an ignition of initial occupant protection devices. For this purpose methods for providing extra energy are described in addition to the energy storage (autarchic capacitors) provided in the peripheral control modules. This extra energy may, for example, be needed for igniting the occupant protection devices. These methods provide the extra energy in a way that does not load the bus system. Thus, the energy storage devices are preferably charged in the transmission pauses or are charged with very low current consumption from the bus system.

A problem with the above methods is seen in that the energy storage devices are severely discharged when an occupant protection device is triggered and consequently a recharging from the bus system starts directly thereafter. Even with current limit circuits that are provided, this recharging can result in a high load on the data transmission system when several occupant protection devices are triggered simultaneously and therefore their energy storage devices must be recharged. It is then possible that control modules of occupant protection systems that are triggered later cannot be timely triggered again at the right time, or possibly interrogation routines to be made cannot be carried out.

Heretofore, only the resistance check in a pyrotechnical igniter of an occupant protection device is known as a method for verifying an executed triggering subsequent to a trigger command. An intact, not yet triggered pyrotechnical igniter has a low resistance. When the pyrotechnical igniter triggers, the ignition wire is either interrupted or in individual cases, can also be short-circuited. A check can therefore be faulty. In addition, the verification is not applicable for other ignition concepts, for example with cold gas generators.

SUMMARY OF THE INVENTION

For the above reasons, it is an object of the invention to provide a method of the above described type wherein an additional load on the bus system subsequent to triggering of individual occupant protection devices can effectively be avoided. In addition, a method for verifying an executed triggering subsequent to a trigger command is shown. This method is based on one of the preceding methods, is very simple and can be reliably implemented. Furthermore, a control module for implementing the method is indicated.

According to the invention energy and data are transmitted through a bus system in an occupant protection system including a central processing unit (7), triggerable occupant protection devices (1.1) communicatively connected through control modules (6) and through said bus system (5) to said central processing unit (7), wherein the following steps are performed:

(a) transmitting data and energy between said central processing unit and said control modules through said bus system, (b) providing a respective energy storage device for each respective control module of said control modules, (c) charging said respective energy storage device through said bus system for a limited time to assure proper operation of said respective control module and of an occupant protection device connected to said respective control module, (d) normally maintaining a charged state of said respective energy storage device, and (e) interrupting said charging and maintaining of the energy storage device of the respective control module in response to an executed triggering of a respective occupant protection device.

An essential feature of the invention is that the charging or recharging of the energy storage device of the already triggered occupant protection devices and/or of the corresponding control modules is interrupted. In this way, the bus system can continue to transmit the digital data undisturbed and the control modules of the occupant protection devices that have not yet been triggered can receive their data. This interruption or suppression can be realized in a particularly safe way and free of loss by high-resistance separation. It is particularly preferable to interrupt the recharging at least until a reset command. The reset command resets the peripheral control modules again and then begins with the recharging of their energy storage devices. The energy available in the energy storage device of an occupant protection device, after the device has been triggered, can be used advantageously for checking and recognizing a successful triggering. If, for example because of a break in the conductor to the igniter of the occupant protection device, the device cannot be triggered, then the energy does not flow from the energy store. This situation can be recognized by a comparison with a rated value and can be displayed or other measures can be taken.

According to the invention there is also provided a control module for an occupant protection system including a central processing unit, triggerable occupant protection devices communicatively connected through control modules and through said bus system to said central processing unit, said control module comprising a switch normally connecting an energy storage device to said bus system for charging said energy storage device through said bus system, a control signal generator operatively connected to said bus system for receiving a trigger signal, said control signal generator having a control output connected to said switch for interrupting said switch after said trigger signal has been received by said control signal generator.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
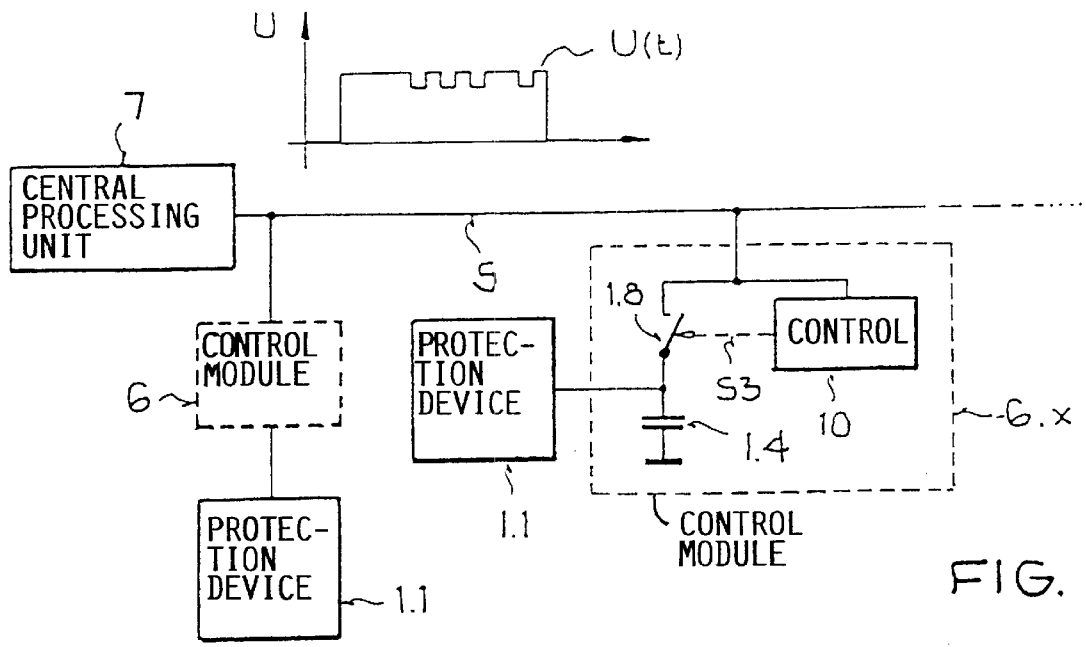
FIG. 1 shows a block diagram of a data transmission system according to the invention.

FIG. 1 shows a block diagram of a bus system for transmitting power and data. This bus system comprises a central processing unit 7 which is connected by the bus system 5 to a plurality of peripheral control modules 6. Also shown schematically in FIG. 1, by way of example, is the selected voltage modulated power and data transmission. The d.c. voltage U(t) generated by the central processing unit 7 provides the power supply. The digital data to be transmitted are modulated onto the d.c. voltage by way of voltage modulation.

For this purpose the d.c. voltage amplitude that is as such constant, is respectively varied. The types of modulation and encoding used for this purpose, for example pulse width modulation, are known in the prior art. The central processing unit 7 is usually constructed as a microcontroller circuit that receives safety relevant signals from sensors such as acceleration sensors, processes these signals, and drives the occupant safety devices accordingly through the bus system 5. An occupant protection device 1.1 is allocated to each of the control modules 6 which drive and, if necessary, trigger the respective devices. Thus, the control modules 6 receive and process the data transmitted from the central processing unit 7, implement internal processes, for example control or programming steps, and trigger, if necessary, the occupant protection device, for example an airbag. In addition, the control modules 6 can also send data back to the central processing unit 7.

By way of example, the essential components for performing the method for a peripheral control module 6.x are shown in greater detail. Here their functions shall be explained only within the context of the method. Thus, each peripheral control module 6 has an energy storage device 1.4 that can be constructed as an autarchic and/or igniting capacitor and/or accumulator as a buffer or an intermediate energy store. It is also conceivable that several energy storage devices are provided in one control module. It makes sense therefore, to reduce the load on the bus system 5, to initially interrupt the recharging of all the energy storage devices 1.4 in the respective control module 6.x subsequent to a triggering of the corresponding occupant protection device 1.1.

This interruption of the recharging is done, for example by a controllable switching means 1.8 which, in the microelectronic realization, is usually constructed of a transistor arrangement and, as will be explained later with reference to FIG. 2, can also be constructed as a controllable charging unit. The switching means 1.8 is driven by a control unit 10 by a signal s3. The control unit 10 is preferably a microcontroller and satisfies all control tasks within the control module 6.x. The control unit 10 receives and processes the data transmitted on the bus system 5, allocates the data that are relevant or intended for the respective control module (6.x) and triggers the corresponding functions in the control module 6.x.

In order to carry out the method, the control unit 10 must recognize at least the trigger command to the control module 6.x. Subsequent to triggering the occupant protection device 1.1, the control unit 10 interrupts the recharging of the energy store 1.4 by means of the signal s3 to the controllable switching means 1.8. Preferably, the control unit 10 can also receive and/or derive a reset command from the central processing unit 7 through the bus system 5 and will subsequently terminate the interruption of the recharging, that is, close again the switching means 1.8 through the signal s3. For this purpose, the control unit 10 is connected in parallel to the switching means 1.8 and with the bus system 5.

In addition to a specified code word, a voltage reset is particularly advantageous as a reset command, that is, a drop in the d.c. voltage level by a defined measure, for example, a drop approaching 0 volts for a certain time. This is very simple to realize and is very easy to recognize. Also, a voltage reset can trigger a plurality of other processes that go beyond the method, but are nevertheless processes that logically belong together temporarily, for example clearing memories, resetting the microcontroller of the control module, etc.

In addition to the parallel connection of the control module 6 to the bus systems 5 shown in FIG. 1, the method is also suitable for serial bus systems.

Figure 2:
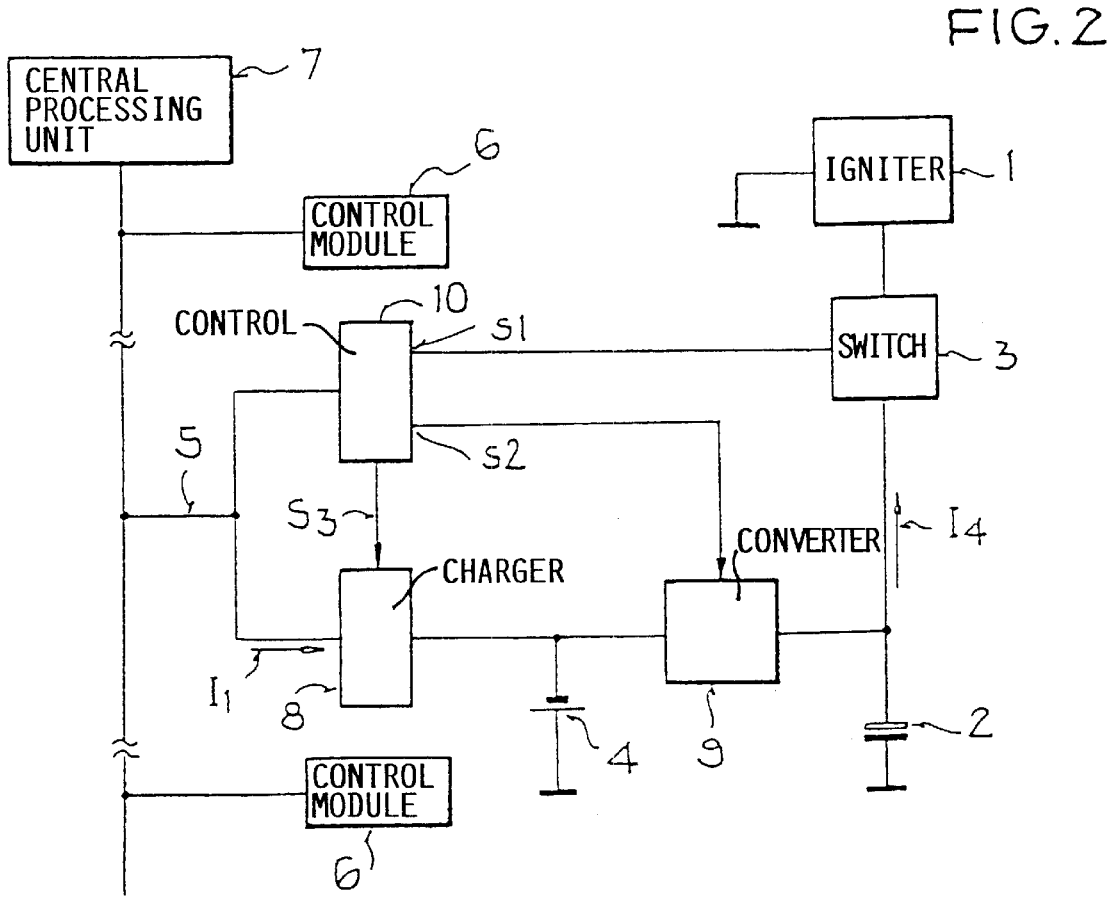
FIG. 2 shows a block diagram of details of an occupant protection device with a control module and energy storage devices according to the invention.

FIG. 2 shows a further developed embodiment of the device shown in FIG. 1 and an occupant protection device similar to the type disclosed in German Patent Publication 197 51 910 and its control module with an ignition current circuit comprising an ignition energy store 2, a switching means 3, and the electric igniter 1.

The ignition current I4 from the ignition energy storage 2 to the igniter 1 is connected by the switching means 3 in response to a first signal s1 from the control unit 10. When the switch 3 is closed the ignition current I4 triggers the igniter 1. An intermediate storage device 4, constructed as an accumulator, is connected to a point between the bus system 5 and the ignition energy storage 2. Additional control modules 6 are connected to the bus system 5, for example for other occupant protection devices, crash sensors, or other motor vehicle electronic control modules. A central processing unit 7 is also connected to an end of the bus system 5. The central processing unit 7 controls the data modulated voltage supply into the bus system 5. The intermediate storage device 4 is charged by means of a charger unit 8 that limits the charging current I1 to a predetermined maximum value and thus, in addition, electrically decouples the intermediate storage device 4 from the bus system 5. A converter 9 is arranged between the intermediate storage device 4 and the ignition energy storage device 2. The converter 9 is drivable by means of a second signal s2 from the control unit 10 depending on the operating state and the trigger command. The control unit 10 gathers the data modulated onto the voltage of the bus system 5 and recognizes from the data the operating state as well as, if applicable, a trigger command. The control unit 10 generates the respective signal s1 for driving the switch 3, the signal s2 for the converter 9, and the signal s3 for the charging unit 8.

The switching means 1.8 shown in FIG. 1 are constructed as a charger 8 in FIG. 2. The charger 8, is driven by the control unit 10 through the signal s3. Thus, after triggering the occupant protection device 1.1 by means of the igniter 1 through the signal s1 from the control unit 10, the charger 8 is blocked by the signal s3, whereby recharging is temporarily interrupted. When the control unit 10 recognizes a reset signal from the bus system 5, then the charger 8 is again activated by the signal s3.

A method for checking whether an occupant protection system has triggered in response to a trigger command offers itself as a further example embodiment for both previously described example embodiments. With this method a short time after suppressing the recharging of the energy storage device, the content of the energy storage device is compared with a rated value and, if the energy content is greater or the same as the rated value, it is recognized that triggering did not take place. A corresponding control device detects, for example, the voltage of the energy storage device 4, 1.4 and reports this detection to the control unit 10, which then sends a corresponding signal through the bus system 5 to the central processing unit 7.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for transmitting energy and data through a bus system (5) in an occupant protection system including a central processing unit (7), triggerable occupant protection devices (1.1) communicatively connected through control modules (6) and through said bus system (5) to said central processing unit (7), said method comprising the following steps:

(a) transmitting data and energy between said central processing unit (7) and said control modules (6) through said bus system (5), (b) providing a respective energy storage device (1.4; 2) for each respective control module (6) of said control modules, (c) charging said respective energy storage device through said bus system (5) for a limited time to assure proper operation of said respective control module and of an occupant protection device connected to said respective control module, (d) normally maintaining a charged state of said respective energy storage device, and (e) interrupting said charging and maintaining of the energy storage device of the respective control module in response to an executed triggering of a respective occupant protection device.

2. The method of claim 1, further comprising performing said step of interrupting by switching off said respective charging device from said bus system.

3. The method of claim 1, further comprising continuing said interrupting until a reset command signal is applied to the respective control module, the occupant protection device of which was triggered.

4. The method of claim 1, further comprising verifying whether or not said triggering of said occupant protection device has taken place, by comparing, after a predetermined time following said interrupting of said charging, an energy content of said respective energy storage device with a rated energy value, and by recognizing that no triggering took place if said energy content is larger or equal to said rated energy value, and recognizing that triggering took place if said energy content is smaller than said rated energy value.

5. A control module for an occupant protection system including a central processing unit (7), triggerable occupant protection devices (1.1) communicatively connected through control modules (6) and through a bus system (5) to said central processing unit (7), said control module comprising a switch (1.8) normally connecting an energy storage device (1.4; 2) to said bus system (5) for charging said energy storage device through said bus system, a control signal generator (10) operatively connected to said bus system for receiving a trigger signal, said control signal generator (10) having a control output (S3) connected to said switch for interrupting said switch (1.8) after said trigger signal has been received by said control signal generator.

6. A control module for an occupant protection system including a central processing unit (7), triggerable occupant protection devices (1.1) communicatively connected through control modules (6) and through a bus system (5) to said central processing unit (7), said control module (6) comprising an energy storage device, a control signal generator (10) operatively connected to said bus system for receiving a trigger signal, said control module further comprising a charger (8) for charging said energy storage device and a control output (S3) connected to said charger for switching off said charger (8) after said trigger signal has been received by said control signal generator.

* * * * *